May 14, 1968 A. C. BERGERON ET AL 3,383,065
STRIP PUNCHING AND FEEDING APPARATUS
Filed April 14, 1965 5 Sheets-Sheet 2
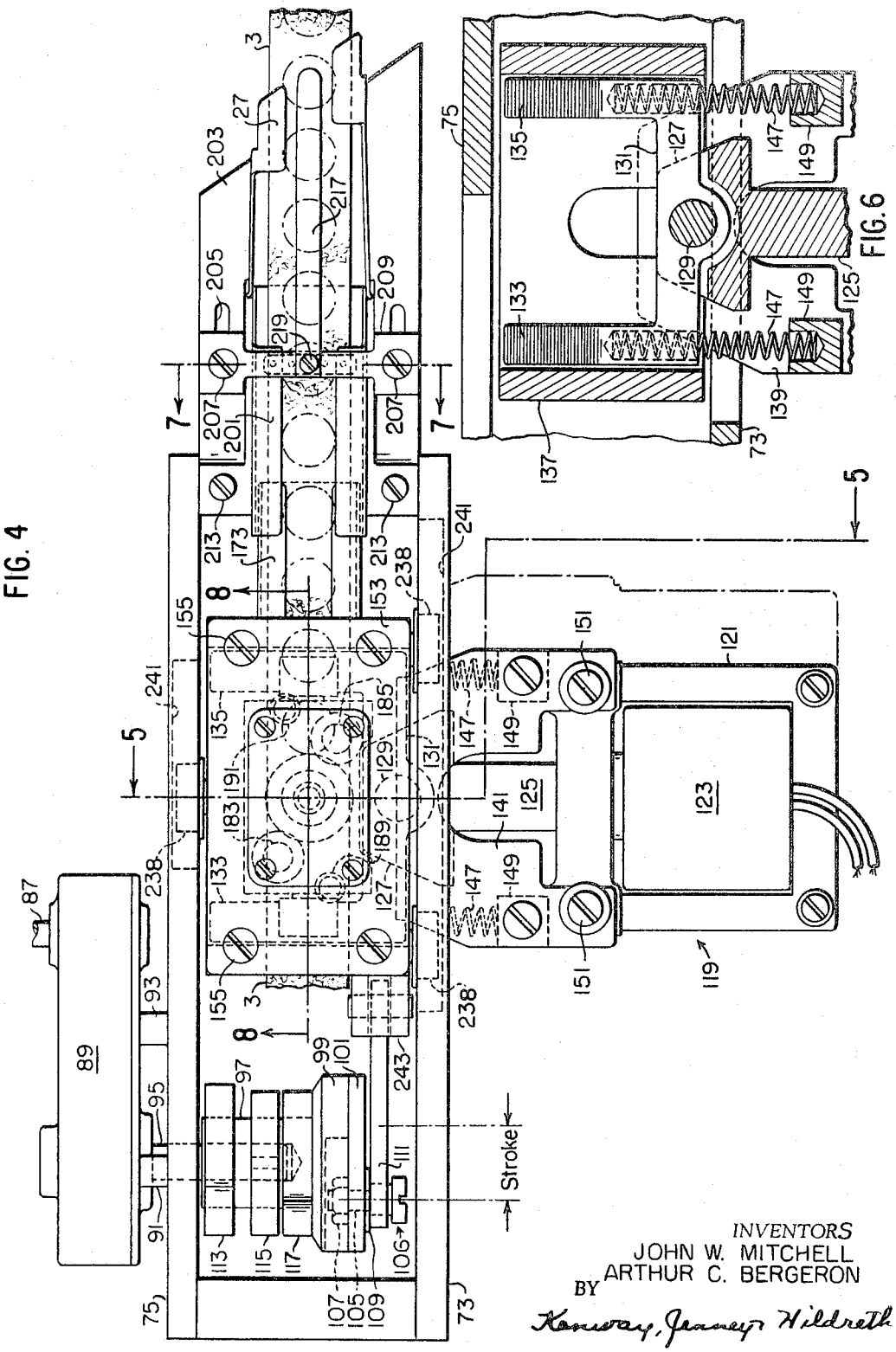
INVENTORS
JOHN W. MITCHELL
ARTHUR C. BERGERON
BY
Kenway, Jenney Hildreth
ATTORNEYS May 14, 1968 A. C. BERGERON ET AL 3,383,065
STRIP PUNCHING AND FEEDING APPARATUS
Filed April 14, 1965 5 Sheets-Sheet 4

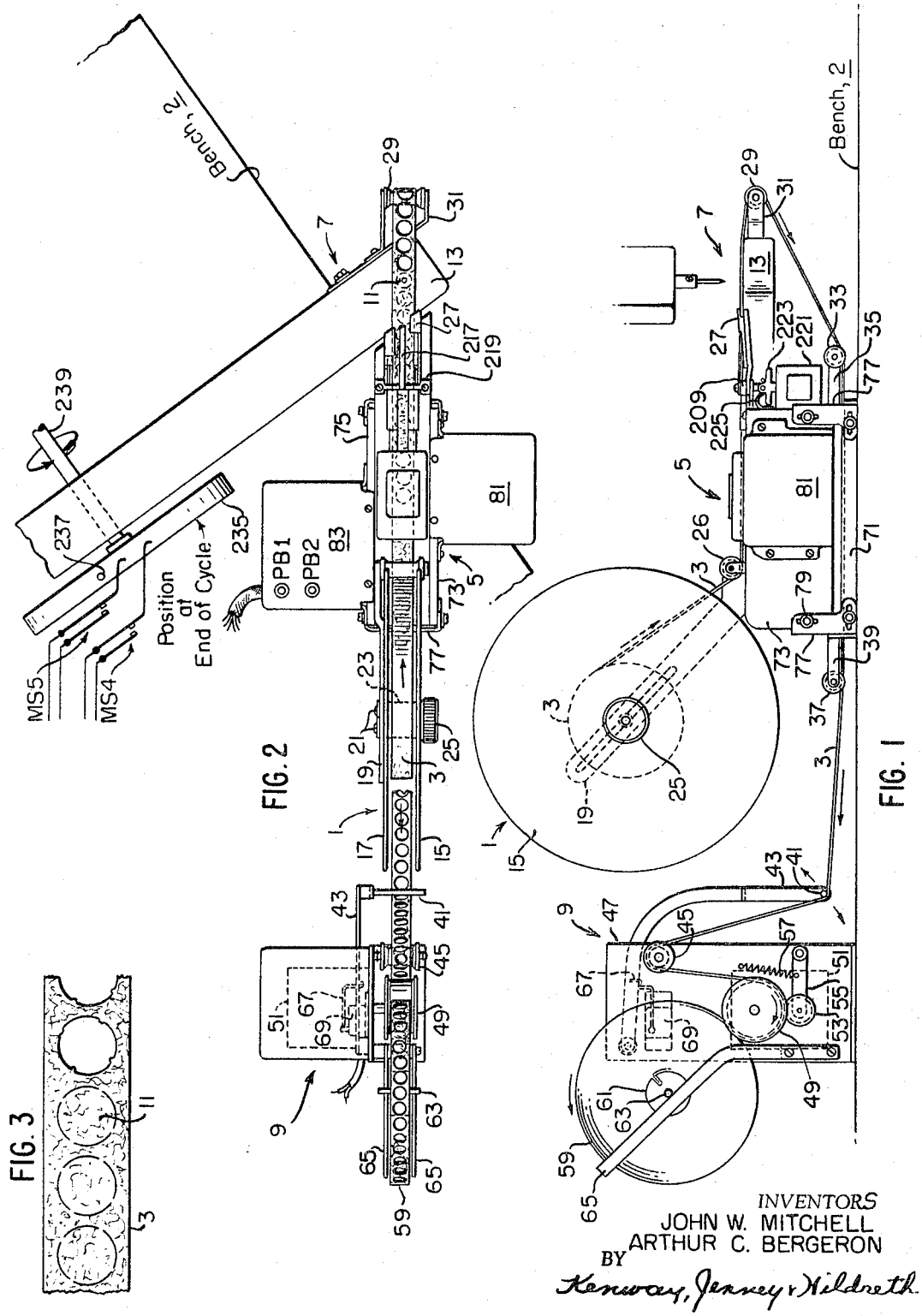

INVENTORS
JOHN W. MITCHELL
ARTHUR C. BERGERON
BY
Kenway, Jenney & Hildreth
ATTORNEYS United States Patent Office 3,383,065
Patented May 14, 1968

3,383,065
STRIP PUNCHING AND FEEDING APPARATUS
Arthur C. Bergeron, Seekonk, and John W. Mitchell, Somerset, Mass., assignors to A. J. Mitchell Co., Fall River, Mass., a corporation of Massachusetts
Filed Apr. 14, 1965, Ser. No. 448,213
11 Claims. (Cl. 242—56.8)

ABSTRACT OF THE DISCLOSURE

A strip punching and feeding apparatus wherein the punch and die are movably secured to a frame for lateral movement. Strip material is fed to the punch and die unit. The punch moves into the die cutting a disc while leaving small retaining ligatures in the outer periphery of the material. While the punch is engaged with the die, the unit moves laterally a predetermined distance carrying the strip and disc so formed with it so that a previously formed disc is fed to a work station. The punch then disengages from the die and both the punch and die return to their formed position the strip material remaining stationary.

---

Our invention relates to strip punching and feeding apparatus, and particularly to novel apparatus for preparing a strip of material on which a series of regularly spaced articles have been prepunched except for small retaining ligatures, and feeding the strip so formed to the work station of a machine.

Numerous manufacturing operations require articles to be assembled together at the work station of a machine. As a specific example, it is common in the garment industry to sew one or more reinforcing backings to a garment during its manufacture, as in the provision of reinforcing backing pieces for buttons, buttonholes, rivet-type fasteners, snap fasteners, or the like. As a specific example, small fabric disks are commonly used as reinforcement backings for buttons on buttondown collars. A disk is placed on the inside of the shirt panel, with the button on the outside, and the button and disk are then sewn to the shirt panel on a sewing machine. It is a primary object of our invention to facilitate manufacturing operations of this kind.

In the manufacture of articles such as garments to which parts such as reinforcements must be attached, it is necessary to bring a supply of the parts to be attached to the work station of the sewing machine or other fastening device, and for this purpose it has been conventional to supply a pile of the parts to an operator, who would place each on the fastening machine, actuate the machine to attach the article, and then repeat the process. The various steps of preparing the articles, as by punching them from a fabric tape or the like, supplying them to the operator, and placing them individually on the machine, are obviously relatively time-consuming and consequently expensive, and it is a more particular object of our invention to reduce the time required for these operations and to correspondingly increase the productivity of garment workers.

Briefly, the apparatus of our invention comprises a strip punching and feeding unit provided with a rod for holding a roll of strip material from which the articles to be attached may be made, such as felt or other fabric tape or the like. The punching and feeding unit is operable to punch an interrupted outline of an article of desired shape from the strip, leaving small retaining ligatures so that the article remains in the strip, and to carry the strip and article so formed forward one step to bring a previously punched article into position at the work station of the fastening machine. The apparatus is arranged to move the strip precisely a predetermined distance after each punching operation, so that the articles will each arrive at the work station of the machine at the same predetermined location. This capability of the apparatus is highly desirable, and indeed essential for automatic operation, since either single errors or cumulative errors in position would make automatic operation impractical. At the end of each stroke of the strip feeding apparatus, a retaining clamp is caused to engage the strip to maintain its position until the next step is taken.

As will appear, after a series of operations the portion of the strip, from which articles have been punched and later removed at the work station of the machine, will accumulate, and apparatus is provided for winding up this used portion of the strip to facilitate its disposal. The winding apparatus is provided with means controlled by the tension in the strip for maintaining a uniform tension.

Manually operated means are provided for sequencing the punching and article feeding apparatus of our invention manually, if desired, as in the initial preparation of the first group of articles in the strip. Preferably, apparatus is also provided for control by the machine during selected portions of its cycle for automatically sequencing the operation of the strip punching and feeding apparatus.

The apparatus of our invention, and its mode of operation, will best be understood in the light of the following detailed description, together with the accompanying drawings, of a preferred embodiment thereof.

In the drawings,

FIG. 1 is a somewhat schematic elevational view, with parts broken away, of a manufacturing station comprising a sewing machine and the strip punching and feeding apparatus of our invention;

FIG. 2 is a plan view, with parts broken away, of the apparatus of FIG. 1;

FIG. 3 is a schematic sketch of a portion of a strip prepared by the apparatus of our invention;

FIG. 4 is an enlarged view of a portion of the apparatus of FIG. 2 with parts broken away and parts removed;

FIG. 6 is a plan view of a portion of the apparatus of FIG. 5, with parts shown in cross-section and parts broken away, taken substantially along the lines 6—6 in FIG. 5;

Figure 5:
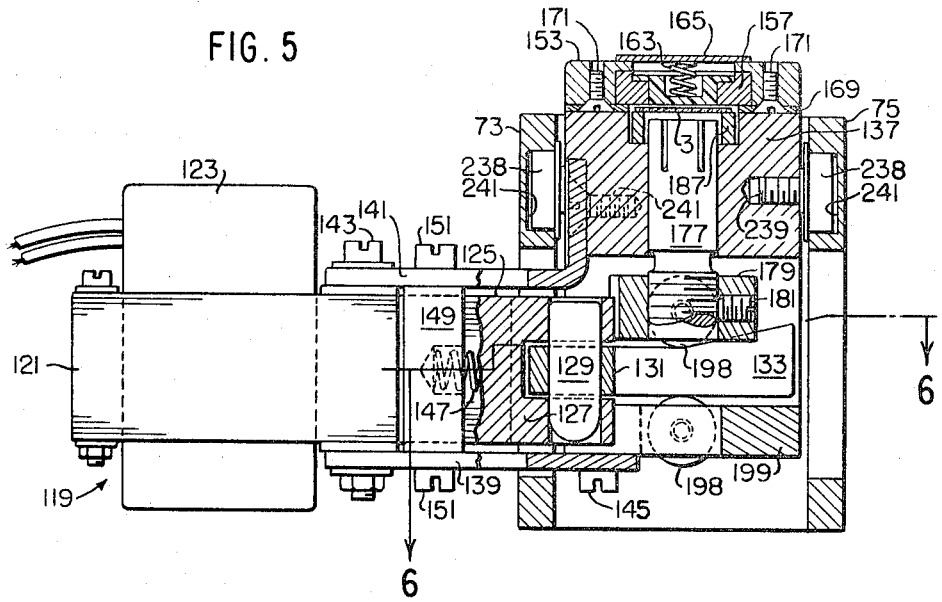
FIG. 5 is an enlarged cross-sectional view of the apparatus of FIG. 4, taken substantially along the lines 5—5 in FIG. 4.

Referring now to the drawings, we have shown the apparatus of our invention in a particular embodiment specifically adapted to prepare and supply to a sewing machine disks of fabric reinforcing material, as used for example in the reinforcement of buttons. As shown in FIGS. 1 and 2, the apparatus comprises generally a reel 1 for holding a supply of tape 3, a strip punching and feeding unit generally designated as 5, a sewing machine having a head generally designated as 7, and a takeup assembly for reeling up used portions of the tape 3 and generally designated as 9. The units 5, 7 and 9 are each mounted on a common support, here shown as a bench 2. In general, at each operation of the strip punching and feeding apparatus 5, an increment of tape 3 is drawn from the reel 1 and a previously prepared reinforcing disk, such as the disk 11 in FIGS. 2 and 3, is supplied to the sewing station on the work table 13 of the sewing machine 7. Used portions of the tape 3 are drawn up under controlled tension by the takeup unit 9.

Referring to FIGS. 1 and 2, the supply reel 1 comprises a conventional pair of side plates 15 and 17, the plate 17 being fixed at an adjustable location on an arm 19 by conventional means such as a pair of screws 21. A fixed spool 23 extends between the side plates, and the plate 15 is clamped to the spool by suitable means such as knurled nut 25. The plate 15 may thus be removed when desired by removing the knob 25, so that a roll of tape 3 may be placed on the spool 23 for rotation with respect thereto as the tape 3 is taken up by the punching and feeding apparatus 5.

The tape 3 passes under an idler 26 mounted on the unit 5, extends through the unit 5 in a manner to be described below, emerges under the guidance of a guide plate 27 secured to the punching and feeding unit, and from there passes over the sewing station on the work table 13 of the sewing machine, over an idler 29 journalled in a bracket 31 fastened to the work table 13, an idler 33 journalled in a bracket 35 secured to the punching and feeding unit 5, through a channel provided at the base of the punching and feeding unit 5, under an idler 37 journalled in a bracket 39 secured to the punching and feeding unit 5, around a pin 41 secured to a tension arm 43, over an idler 45 journalled in the frame 47 of the rewinding apparatus 9, to the takeup mechanism of the rewinding apparatus 9.

The apparatus 9 comprises a drive roll 49 provided with a resilient friction surface of rubber or the like and mounted on the output shaft of a conventional takeup motor 51 (FIG. 9), the tape 3 passing between this roll and an idler 53 journalled on an arm 55. The arm 55 is journalled in the frame 47, and the idler 53 is urged against the drive roll 49 by a spring 57. The roll 49 also drives the roll 59 of the used tape 3 as it builds up on an arbor 61. The arbor 61 is provided with an axle pin 63 that rides up over a pair of rails 65 as the supply of waste tape builds up. The rails 65 are secured by any suitable conventional means to the frame 47 of the apparatus 9. When the pin 63 rides near the top of the rails 65, the reel of waste tape may be taken off and disposed of, and the arbor removed, connected to the end of the strip of waste tape, and replaced on the rails.

The tension arm 43 is journalled in the frame 47, so that it tends to fall down against the tape 3. When the tape 3 is sufficiently slack, the arm 43 engages the actuator 67 of a microswitch 69, closing a circuit for the control of the drive motor for the roll 49, in a manner to be described, to cause the motor to run. When the tape 3 is sufficiently taut, the switch 69 will be opened to stop the motor. The tension arm thus maintains the strip of tape 3 under essentially constant tension.

Considering now the strip punching and feeding unit 5, as shown in FIGS. 1 and 2, it comprises a base plate 71 bolted or otherwise secured to the bench 2, and a pair of side plates 73 and 75 adjustably fixed with respect to the base plate 71 by means of brackets 77 and bolts such as 79. The adjustment thus provided makes it possible to accommodate the punching and feeding unit to the height of the work table 13. A solenoid housing 81 is bolted to the side plate 73, and a motor and gear box housing 83 is bolted to the side plate 75.

Figure 9:
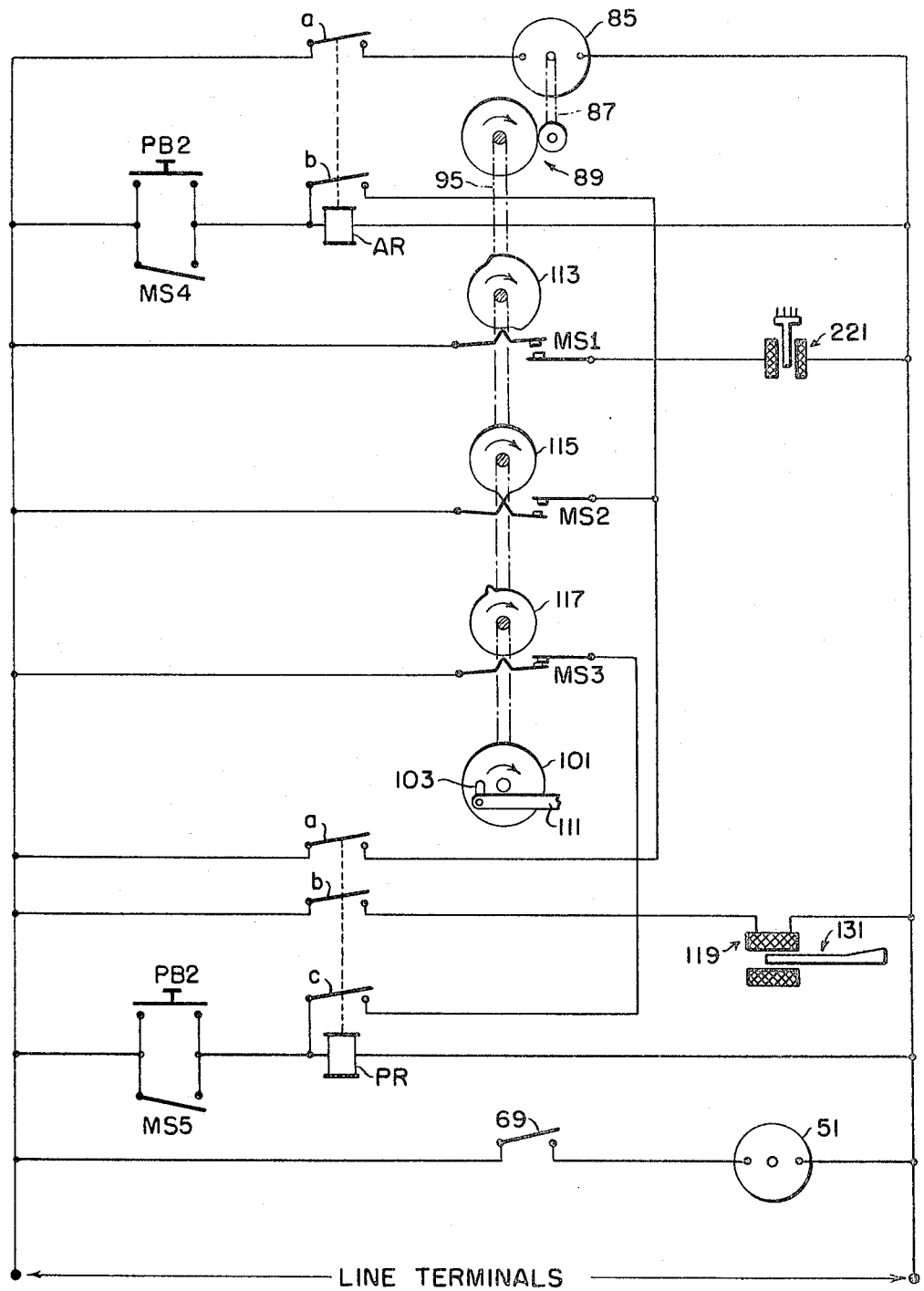
FIG. 9 is a schematic wiring diagram of an electrical control system for the apparatus of FIGS. 1–8.

Comparing FIGS. 2, 4 and 9, within the housing 83 is located a conventional electric motor 85 having a drive shaft 87 connected to the input of a conventional reduction gear train 89. The gear train 89 is secured to the side plate 75 by means of conventional bolts, not shown, within spacers such as the spacers 91 and 93. The output shaft 95 passes through a suitable aperture in the plate 75, and is adjustably secured to a collar 97, as by means of a set screw, not shown, through the collar 97 and engaging the shaft 95. The collar 97 has an enlarged flange 99 formed at its outward end. A cover plate 101 is bolted to the flange 99, and is provided with an arcuate slot 103, as best shown in FIG. 9, to receive the threaded projection 105 of a bearing stud generally designated as 106. The bearing stud is fixed to the cover plate 101 by means of a nut 107, received within a recess in the flange 99, and a flange 109 formed on the bearing stud 106. A crank shaft 111 is journalled on the bearing stud between the flange 109 and the head of the bearing stud.

Three cams 113, 115 and 117 are each adjustably secured to the collar 97 by means of individual set screws, not shown. The function of these cams will be discussed below.

Comparing FIGS. 2 and 4, within the housing 81 is movably mounted a punch solenoid generally designated as 119. As shown in FIGS. 4 and 5, the solenoid 119 is provided with a laminated core 121 on which is wound a coil 123. The solenoid is provided with an actuating arm 125 having an enlarged head 127 provided with a recess to receive a connecting pin 129. The pin 129 passes through and retains a cam yoke 131 having a pair of cam extensions 133 and 135. As best shown in FIGS. 4, 5 and 6, the solenoid 119 is secured to a punch block 137 by means of a lower plate 139 and an upper bracket 141, together with suitable fastening means such as the bolts 143 connecting the plate and bracket to the frame of the solenoid 119 and screws such as 145 connecting the plate and bracket to the punch block 137. A pair of springs 147 extends between recesses in the cam members 133 and 135 and opposing recesses in a pair of posts 149 held between the plate 139 and the bracket 141 by means of screws 151. The springs 147 urge the cam yoke assembly to the position shown in FIGS. 5 and 6 when the solenoid is deenergized.

Referring now to FIGS. 4, 5, 8A and 8B, a die block 153 is secured to the punch block 137 by conventional means such as the screws 155. Received within a suitable aperture in the die block 153 is a die 157 provided with an aperture, as indicated at 159, corresponding to the shape of the desired pieces to be punched from the strip 3. Within this aperture 159 is received the reduced end of a retainer 161 of plastic or the like. The retainer 161 is urged downwardly, toward a position in which its flanged portion engages a corresponding ledge in the die 159, by a retainer spring 163 held down by a spring retainer 165 secured to the die block by means such as the screws 167. As best shown in FIG. 5, the die 157 is held in place by a washer 169 secured to the die block by means of screws 171. It will be seen that with the punch in the lowered position shown in FIG. 8A, the strip 3 passes underneath the die block 153 and out through a strip guide 173 secured to the punch block 137 by means such as the screw 175.

A punch 177 is threaded into a punch holder 179 and there secured in adjusted relation by means such as the set screw 181 shown in FIG. 5.

Figure 8A:
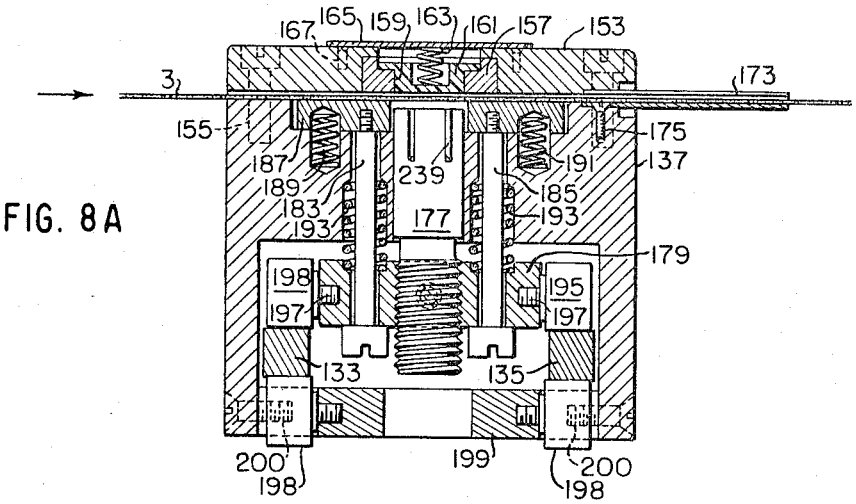
FIGS. 8A and 8B are schematic cross-sectional views each taken approximately along the lines 8—8 in FIG. 4 and showing the punch in its two extreme positions, with other parts shown modified somewhat in scale and location to facilitate the illustration of their relationship.
Figure 8B:
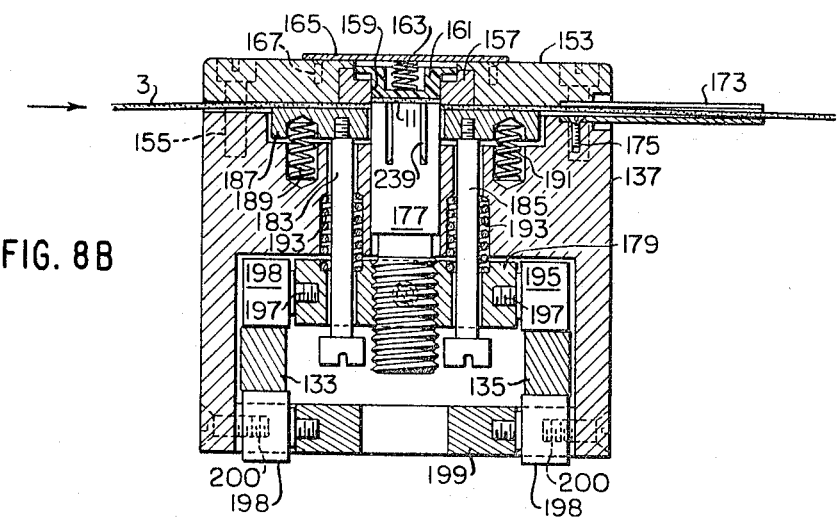

The punch 177 is provided with cutting edges conforming generally to an outline of the article to be punched from the tape, but relieved by four grooves 239 to leave the retaining ligatures shown and described in connection with FIG. 3 above. Two bolts 183 and 185, as shown in FIG. 8A, are provided with studs for threaded engagement with a stripper plate 187. The plate 187 is held at a maximum extension from the punch holder 179 by means of the heads of the bolts 183 and 185 in the position of the apparatus shown in FIG. 8A, and is allowed to come closer to the punch holder 179 when the parts are in the position shown in FIG. 8B. The stripper plate 187 is urged away from the punch holder 179 by means of a pair of stripper springs 189 and 191. It should be noted in this regard that FIGS. 8A and 8B are not literal sections of FIG. 4, but have been devised to show the functional relationship of the parts as well as a possible location. The actual location of the centers of the bolts 183 and 185, and of the stripper springs 189 and 191, are shown in dotted lines in FIG. 4. By the arrangement shown in FIG. 4, larger parts may be used without enlarging the overall size of the punch block.

The punch holder 179 is urged downwardly with respect to the punch block 137 by means of the springs 193, as shown in FIGS. 8A and 8B. The position of the punch 177 is determined by the positions of the cams 133 and 135, as shown in FIGS. 5, 8A and 8B. These cams ride between roller bearing cam followers 195, mounted by means such as the stud 197 to the punch holder 179, and engaging the upper surfaces of the cams 133 and 135, and a lower pair of roller bearing cam followers 198, similarly secured by studs to a slide retainer plate 199 bolted to the punch block 137 by means such as the screw 200.

Figure 7:
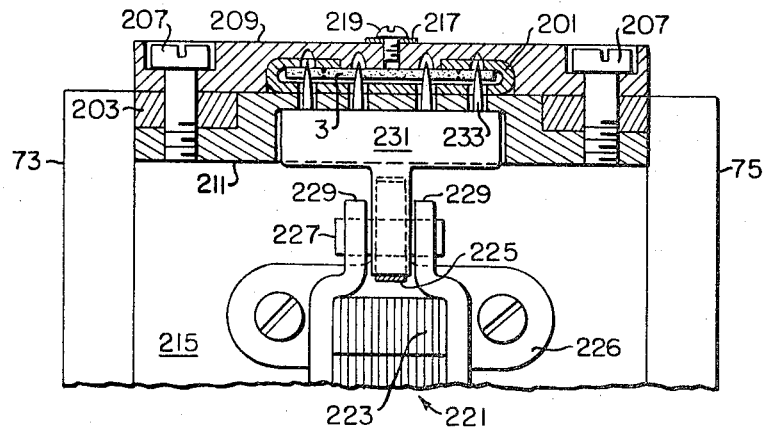
FIG. 7 is a fragmentary cross-sectional view on an enlarged scale taken substantially along the lines 7—7 in FIG. 4.

Referring now to FIGS. 4 and 7, the tape guide 173 protruding from the punch block 137 telescopes into a mating guide portion 201, and the other portion of the guide 201 similarly telescopes into the guiding portion 27. The guiding portion 27 is mounted by conventional means, not shown, to an adjustable plate 203 provided with slots as at 205 to receive screws 207 with clearance. The heads of the screws engage a bridge member 209, and the screws are threaded into engagement with a mounting bracket 211, such that the plate 203 is adjustably clamped in position between the bridge member 209 and the bracket 211. The bracket 211 is mounted by conventional means such as the bolts 213 to a plate 215 bolted or otherwise secured to the side plates 73 and 75. A spring finger 217 is secured to the bridge member 209 by means of a screw 219, and serves to yieldably urge the tape 3 down against the base of the guide 27.

Referring now to FIGS. 1 and 7, a clamp solenoid 221 is secured to the plate 215, and has an actuating arm 223 held upward in a deenergized state of the solenoid by a spring 225. The spring 225 is formed with a bracket portion 226 bolted to the plate 215. The end of the spring 225 urges upwardly a clamp comprising a pin block 231 connected by a pin 227 to bracket extension portions 229 of the actuating arm of the solenoid 221.

In the pin block 231 are mounted four pins 233. These pins 233 protrude through apertures in the bracket 211 and in the guide portion 201 with clearance, and the bridge member 209 is recessed slightly to permit them to pass through the tape 3 before the pin block engages the bracket 211. As indicated, two of the pins 233 engage the tape 3 within the confines of the area to be punched out, and two engage the tape outside of this area.

Referring now to FIG. 9, the control apparatus for the takeup motor 51 of the re-reeling apparatus 9 in FIG. 1, the advance motor 85 for the punching and feeding apparatus 5 in FIG. 1, the punch solenoid 119, and the clamp solenoid 221 will next be described. As indicated in FIG. 9, the control circuit for the takeup motor 51 simply comprises the switch 69, controlled by the tension arm 43 in FIG. 1 to energize the motor whenever the tension in the used tape 3 is insufficient. An additional switch, not shown, may be provided if desired to disconnect the motor at will. The punch solenoid 119 is controlled by a punch relay PR, of any suitable conventional design. The punch relay PR may be energized, to close its contacts a, b and c, either by momentary depression of a spring-returned pushbutton PB1, or by momentary closure of a switch MS5.

Referring now to FIG. 2, the pushbutton PB1 is physically mounted on the motor and gear housing 83. The switch MS5 is arranged to be actuated by a cam 235 provided with a cam projection 237 at a desired moment in the cycle of operation of the automatic sewing machine 7. For this purpose, the cam 235 is schematically indicated as mounted on a shaft 239, assumed to be arranged in a conventional manner to operate in a cycle determined by the mode of operation of the machine. Closure of the switch MS5 would normally take place after the completion of the sewing of the disks 11 by the sewing machine, when it was desired to supply a new disk to the machine work station.

The relay PR is provided with a holding circuit over its own front contact c and a microswitch MS3 in its closed position. This microswitch MS3 is arranged to be opened momentarily during the cycle of the apparatus by a cam 117, this cam being located as shown in FIG. 4 and described above, to be driven by the advance motor 85 through the reduction gear train 89.

Referring now to FIGS. 4 and 5, the assembly comprising the punch block 137 and the solenoid 119 is arranged to move with respect to the side plates 73 and 75 on roller bearings 238 secured to the punch block 137 by means such as the stud 239. As indicated in FIG. 4, there are two roller bearings 238 on one side of the punch block, and one on the other side. These roller bearings 238 ride in ways 241 provided by slots in the side plates 73 and 75. The position of the punch carriage, comprising the punch block and the parts connected thereto, along these ways is determined by the crank-shaft 111, one end of which is connected to the punch block assembly as indicated at 243.

The punch solenoid 119 is energized when the relay PR is energized by a circuit closed over the front contact b of that relay. The punch is thus energized from the time that either the pushbutton PB1 or the control switch MS5 is momentarily engaged, and stays energized until the time that the switch MS3 is opened by the cam 117.

The advance motor 85 has an energizing circuit closed over the front contact a of an advance motor relay AR in the energized state of that relay. The relay AR has an energizing circuit extending over the contacts of a spring-returned pushbutton PB2, closed when the pushbutton is momentarily depressed, and a parallel energizing circuit extending over a switch MS4. Referring now to FIG. 2, the pushbutton PB2 is located on the motor and gear box housing 83, and the switch MS4 is arranged to be momentarily closed by the projection 237 on the cam 235 shortly after the switch MS5 had been actuated toward the end of the cycle of the sewing machine after the completion of the sewing operation. Since the manner in which sewing machines may be employed to control switches at various times in their operating cycles to perform external control functions is well known, this matter will not be described in detail here.

The relay AR has a holding circuit completed over its own front contact b, and thence over a first path including the front contact a of the relay PR in its energized condition, and a second parallel path extending over a switch MS2 closed during most of a revolution of the cam 115 and opened at the end of the resolution. The relay AR will thus be energized, once it has initially been energized by the pushbutton PB2 or the switch MS4, until both the relay PR has been released and the switch MS2 has been opened by the cam 115.

The clamp solenoid 221 has an energizing circuit extending over the closed contacts of the switch MS1. The switch MS1 is controlled by the cam 113, such that the switch will be closed during about a half cycle of rotation of the cam 113. When energized, the clamp solenoid 221 will hold the pin block 231 in FIG. 7 out of engagement with the tape 3.

Having described the structure of the preferred embodiment of our invention, its operation will next be described in both manual and automatic modes. First, assume that the punch is in the position shown in FIG. 8A, the punch carriage is in the retracted position with the crankshaft 11 in substantially the position shown in FIG. 4, a supply of fabric tape is in position on the spool 1, and the end of the strip 3 has been threaded through the punching and feeding apparatus 5 in the manner shown in FIG. 8A. An initial set of disks may be prepared by sequentially actuating the pushbuttons PB1 and PB2. First, with the apparatus in the condition shown in FIG. 9, the pushbutton PB1 is momentarily depressed to energize the relay PR. The punch solenoid 119 is now actuated, driving the cams 133 and 135 to the left in FIG. 5 and raising the punch into engagement with the tape.

As the punch goes upward through the material of the disk 3, it will drive a disk 11 into the die 157, except for the retaining ligatures discussed above, and the disk retainer 161 will move upward against the spring 163. Next, the pushbutton PB2 is momentarily depressed, to energize the relay AR and cause the advance motor 85 to operate. The crank 111 will now drive the carriage comprising the punch block and solenoid assembly forward, or to the right in FIGS. 1, 2 and 4, moving the tape 3 forward with the punch 177 still in the position shown in FIG. 8B. The relay AR will remain up over its holding circuit including the front contact $a$ of the relay PR; as the advance motor 85 continues to operate, the cam 115 will close the switch MS2, and complete the second holding circuit for the relay AR. As the motor begins to rotate, the cam 113 will close the microswitch MS1, and energize the clamp solenoid 221 to pull the pin block 231 out of the way. While the clamp solenoid is still energized, toward the end of the throw of the crank arm 111, the switch MS3 is opened by the cam 117, and the relay PR drops away to deenergize the punch solenoid 119 and allows the punch to fall away. Referring to FIG. 8B, as the punch 177 comes down, the disk 11 is brought back into position in the strip 3 by the retainer 161 moving down under the influence of the spring 163, and the strip 3 is held up against the die block 153 by the action of the stripper plate 187 and the springs 189 and 191. The disk is thus brought back into position in the strip 3 and retained by the ligatures discussed above.

As the punch is withdrawn, the cam 113 opens the switch MS1 to deenergize the clamp solenoid and allow the clamp comprising the pin block 231 in FIG. 7 to move upward into engagement with the fabric, holding the strip 3 firmly in place. The exact relative timing of the switches MS1 and MS3 depends on the delays inherent in the operation of the particular solenoids and spring employed. These switches should be adjusted by adjustment of the cams 113 and 117 on the collar 97, so that the punch is withdrawn just as the clamp is engaged, and before the carriage begins its return movement. The adjustment is not difficult, as the rate of change of carriage position with crank angle is small toward the end of the stroke of the crank. The motor 85 then continues to advance over the back stroke of the punch carriage, carrying the carriage back to the initial position shown in FIG. 4. At the end of this back stroke, the cam 115 opens the switch MS2, and the relay AR drops away. The other holding circuit for the relay AR was broken when the punch relay PR was released. The apparatus is thus in its initial position, one disk has been prepared and the tape advanced one position, and this operation may be repeated by manual operation of the pushbuttons PB1 and PB2 until the prepared disks reach the sewing location and, if desired, until the used tape may be placed on the retrieving spool 61. Alternatively, the sewing machine may be started and automatic sewing continued, with sequential operation of the switches MS4 and MS5 taking the place of the sequential operations of the pushbuttons PB1 and PB2, until a sufficient supply of tape has been accumulated to allow the end strip of used tape to be inserted in the reeling apparatus 9. It will be apparent that the sequential operation of the apparatus will be the same as that described above in connection with the manual operation, except that the switches MS4 and MS5 take the place of the switches PB2 and PB1 in controlling the operation.

While we have described our invention with respect to the details of a particular preferred embodiment thereof, many changes and variations will become apparent to those skilled in the art after reading our description, and such can obviously be made without departing from the scope of our invention.

Having thus described our invention, what we claim is:

1. In strip punching and feeding apparatus, the combination of a frame, a carriage, guide means mounting said carriage in said frame for movement back and forth over a predetermined path between a first and a second position, a die mounted in said carriage, a punch movably mounted on said carriage for movement between first and second positions in a line normal to said path and engaging said die in its second position, positioning means connected to said punch and settable to a first state in which said punch is moved to its first position and a second state in which said punch is moved to its second position, means connected to said frame for guiding a strip of material between said punch and said die with said punch in its first position, drive means operatively connected to said carriage and actuable to reciprocate it from its first position to its second position and back to its first position, control means for setting said positioning means to its second state, and means controlled by said drive means when the carriage is substantially at its second position for setting said positioning means to its first state, whereby when a strip of material is guided between said punch and said die and said control means and said drive means are sequentially actuated the strip is sequentially engaged by said punch and die, translated and released.

2. Apparatus of the class described, comprising a support, a carriage mounted on said support for movement between first and second positions, punching means mounted on said carriage and actuable to an open position for receiving a strip of material and to a closed position for cutting a predetermined pattern in the strip to form an article connected to the strip by a series of ligatures, means for actuating said punching means to its closed position, drive means connected to said carriage and actuable to reciprocate said carriage from its first position to its second position and back to its first position, and means actuated by said drive means when said carriage is substantially in its second position for actuating said punching means to its open position.

3. In combination, a support, a carriage guided in said support for movement between a first and a second position, punching means mounted on said carriage and provided with a channel adapted to receive a strip of material, said punching means being actuable to an open position in which a strip can pass freely through said channel and a closed position in which an article is substantially cut from the strip and the strip is held against movement, control means for actuating said punching means to its closed position, clamping means mounted on said support and actuable to an open position and to a closed position in which a strip threaded through said channel and engaged by said clamping means is held against movement, drive means mounted on said support and connected to said carriage and operable when actuated to move said carriage from its first to its second position and back again, means controlled by said drive means for actuating said clamping means to its open position when said carriage starts to move from its first position to its second position, and means controlled by said drive means when said carriage reaches its second position for substantially simultaneously actuating said punching means to its open position and said clamping means to its closed position.

4. In combination, a supply of fabric tape, tape punching and feeding means, tape guide means, and tape tensioning means for holding a strip of tape under tension mounted in fixed spaced relationship, tape from said supply being adapted to pass from the supply to said punching and feeding means and thence over the work station of a machine to said tensioning means with the guidance of said guide means, said tape punching and feeding means comprising a carriage, a frame supporting said carriage for movement over a predetermined path between first and second positions aligned with said tape, a channel in said carriage for receiving said tape, punching means on said carriage, means resiliently urging said punching means to a first position out of contact with tape in said channel, actuating means responsive to an applied signal for driving said punching means to a second position in contact with a tape in said channel to hold the tape and substantially cut an article of predetermined shape therefrom, drive means responsive to an applied signal for reciprocating said carriage from its first position to its second position and back again, bistable means settable to first and second states, means controlled by said bistable means in its second state for applying a signal to said actuating means, control means for setting said bistable means to its second state, clamp means mounted on said frame and having a closed position in which said tape is held fixed with respect to said frame and an open position, means controlled by said drive means for holding said clamp in open position while said carriage is moved from its first to its second position, and means controlled by said drive means for setting said bistable means to its first state and releasing said clamp as said carriage reaches its second position.

5. In combination, a support, a fabric clamp mounted on said support and resiliently biased toward closed position for engaging and holding a strip of material and actuable to an open position, punching means mounted on said support for movement from a first position to a second position, said punching means being provided with a channel adapted to receive a strip of material and having a closed position for holding the strip in the channel and cutting in it a pattern of slits and an open position in which the strip is free to pass through the channel, drive means responsive to an applied signal for reciprocating said punching means from its first position to its second position and back again, bistable means actuable to a first and a second state, means controlled by said bistable means in its second state for driving said punching means to its closed position, means for restoring said punching means to its open position with said bistable means in its first state, means controlled by said drive means for holding said clamp in its open position while said punching means is moved from its first position to its second position, means controlled by said drive means for substantially simultaneously setting said bistable means to its first state and releasing said clamp to its closed position when said punching means reaches its second position, and means for sequentially setting said bistable means to its second state and applying a signal to said drive means.

6. Control apparatus for sequentially punching and feeding a strip of material, comprising a support, clamp means mounted on the support for movement between an open position and a closed position and adapted to hold a strip of material fixed with respect to said support in its closed position, spring means urging said clamp to its closed position, first solenoid means operable when energized to move said clamp to its open position, means movably mounted on the support for movement between a first position and a second position in a line with said first clamp, punch means having an open position and a closed cutting position and adapted to hold a strip of material in its closed position, spring means urging said punch means to its open position, second solenoid means operable when energized to hold said punch means in its closed position, a drive motor mounted on said support and having an output shaft, crank means mounted on said output shaft for reciprocating said punch means between its first and its second positions upon rotation of said shaft, cam means mounted on said shaft, a first register and a second register each settable to first and second states, sequencing means for sequentially actuating said registers to their second states, means actuated by said first register in its second state for energizing said second solenoid means, means actuated by said second register in its second state for energizing said drive motor to rotate said shaft, means actuated by said cam means while said punch means is moving from its first to its second position for energizing said first solenoid means, means actuated by said cam means as said punch means reaches its second position for de-energizing said first solenoid means and setting said first register to its first state, and means actuated by said cam means when said punch means returns to its second position for setting said second register to its second state.

7. In combination a frame, carriage, guide means mounting said carriage in said frame for movement back and forth over a predetermined path between a first and second position, drive means to drive the carriage between a first and second position, a punch block mounted in said carriage, a punch reciprocably mounted in said block for movement between a first disengaged and second engaged position in a line normal to said path, a die mounted on said block and having a surface confronting said punch and provided with an aperture of predetermined shape, adapted to receive said punch, said punch having a cutting end confronting said die and entering the aperture in said die in said second engaged position, said cutting end being relieved at a series of spaced points, whereby an article of said shape is substantially punched from a strip of material placed between said punch and die when said punch is moved from its first disengaged to its second engaged position, and the article is retained in the strip by a series of ligatures at said relieved points, said punch remaining in the second engaged position while the carriage moves between its first and second position, a retainer corresponding in shape to and located in said aperture for movement between a first position engaging said punch in its second engaged position and a second position flush with said face and means resiliently urging said retainer to its second position, whereby an article substantially punched from a sheet as above recited is returned to the plane of the strip when said punch is restored to its first disengaged position.

8. The apparatus of claim 7, further comprising a stripper plate provided with an aperture receiving said punch and mounted on said punch with lost motion for movement between a first position engaging said surface of said die and a second position separated from the die by an amount sufficient to clear a strip of material in position for punching as above recited, and resilient means urging said stripper plate towards its first position to hold a strip punched as above recited in engagement with said die while said punch is withdrawn.

9. The apparatus of claim 7, further comprising cam means movably mounted on said punch block for movement between a first and a second position and operatively connected to said punch for holding it in and moving it between its corresponding first and second positions, resilient means urging said cam means to its first position, and solenoid means mounted on said punch block and connected to said cam means and operable when energized to move said cam means to its second position.

10. The apparatus of claim 9, further comprising a frame, guide means on said frame mounting said punch block for linear movement between first and second positions, drive means mounted on said frame, connected to said punch block, and operable when energized to reciprocate said punch block from its first to its second position and back to its first position, clamp means having first and second positions mounted on said frame beyond said punch block in the direction from the first to the second position of the block for holding in its second position a strip of material extending between said punch and die, sequencing means for sequentially energizing said solenoid means and said drive means and moving said clamp means to its first position, and means controlled by said drive means with said punch in its second position for substantially simultaneously deenergizing said solenoid means and moving said clamp to its second position.

11. In combination with a machine having a work station, apparatus for forming a series of articles of predetermined shape in a strip of material, feeding the strip to the work station to be sequentially removed from the tape and utilized in a manufacturing operation, and storing the used portion of the strip from which the articles have been removed, comprising, in combination, a support, a clamp mounted on said support and having a closed position for clamping a strip of material to said support and an open position, a punch movably mounted on said support for movement between first and second positions, said punch being provided with a channel for receiving a strip of material and having an open position and a closed position, said punch comprising cutting means for cutting an interrupted outline of an article of predetermined shape in a strip inserted in said channel and holding the strip in the channel in the closed position of the punch, whereby an article is formed in the strip and retained therein by at least one ligature when the punch is moved from its open to its closed position with a strip in the channel, drive means connected to said punch and operable when energized to reciprocate the punch from its first to its second position and back to its first position, means fixed with respect to the support for guiding a strip of punched articles from the punch and clamp over the work station, winding means fixed with respect to said support, adapted to be connected to the end of a used strip beyond the work station, and operable when energized for winding the used strip into a roll for disposal, tensioning means controlled by the tension in a strip extending from the punch and clamp to the winding means for energizing said winding means when said tension falls below a predetermined value, means for sequentially actuating said punch to its closed position and energizing said drive means, means controlled by said drive means while moving said punch from its first to its second position for holding said clamp in its open position, and means actuated by said drive means as said punch reaches its second position for restoring said punch to its first position and moving said clamp to its closed position.

References Cited

UNITED STATES PATENTS

| | | | |
|---|---|---|---|
| 1,019,005 | 2/1912 | Havener | 83—218 |
| 2,097,142 | 10/1937 | Borton | 242—75.5 |
| 2,202,889 | 6/1940 | Bates | 242—56.8 X |
| 412,618 | 10/1889 | Holz | 83—108 X |
| 1,172,058 | 2/1916 | Scheyer | 83—575 X |
| 2,364,835 | 12/1944 | Whistler et al. | 83—140 |

ANDREW R. JUHASZ, *Primary Examiner.*